(No Model.) 2 Sheets—Sheet 2.
J. L. STEWART.
INCANDESCENT GAS BURNER.
No. 409,520. Patented Aug. 20, 1889.
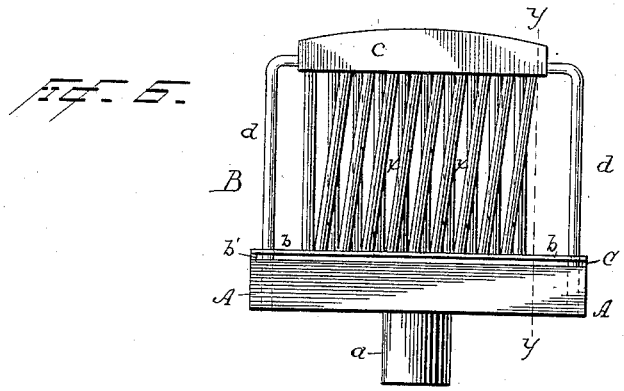
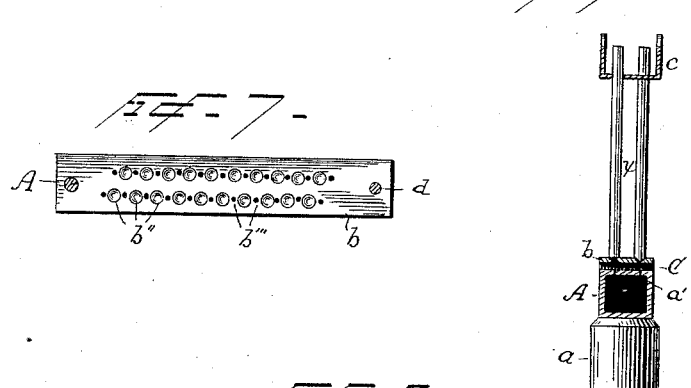
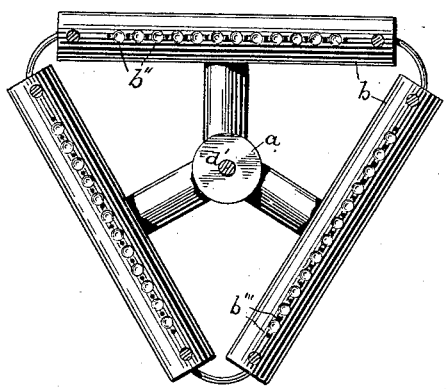
WITNESSES
Norris A. Clark
Jno. C. Schroeder
INVENTOR
John L. Stewart
By E. B. Clark
Atty.

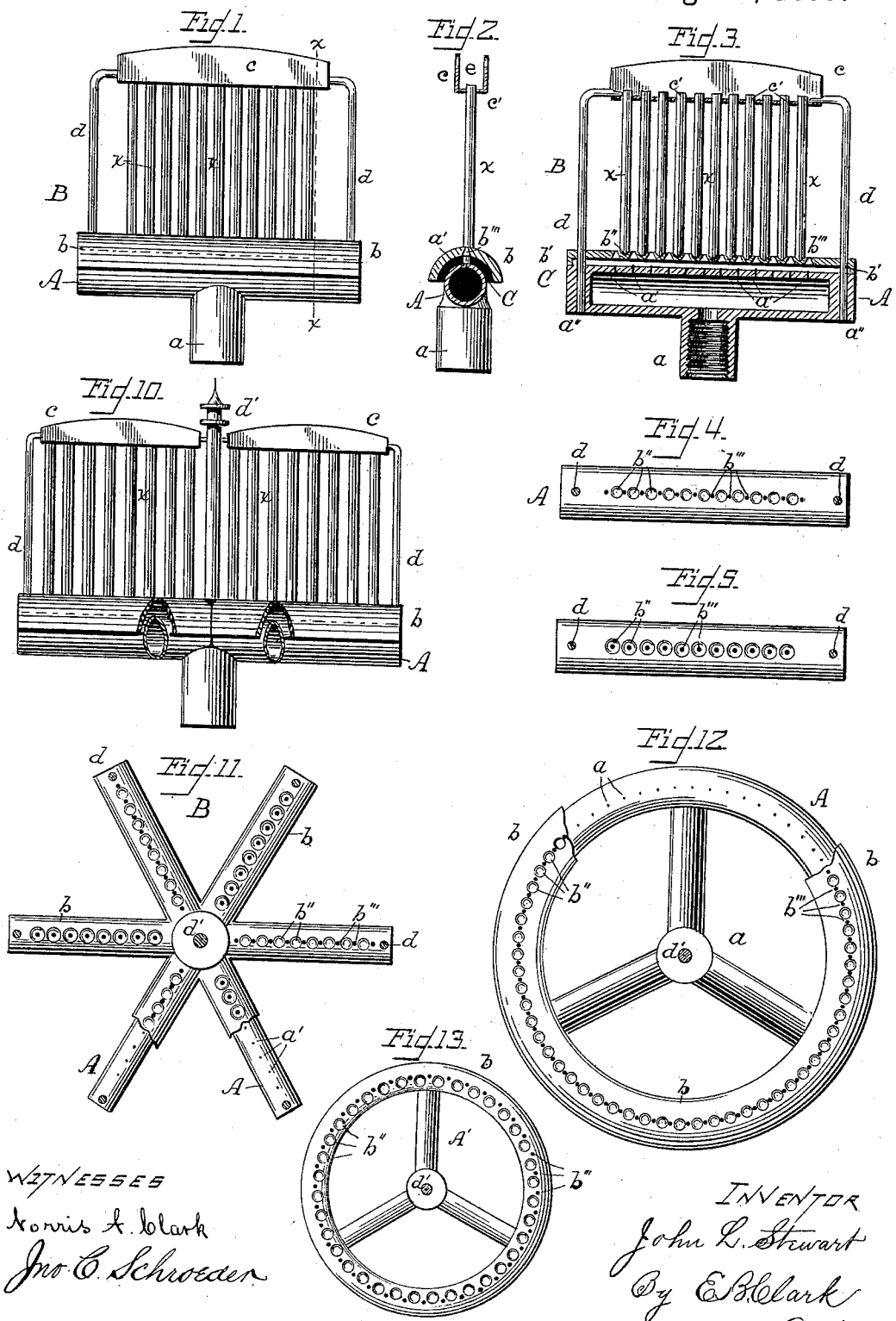

UNITED STATES PATENT OFFICE.

JOHN L. STEWART, OF PHILADELPHIA, PENNSYLVANIA, ASSIGNOR, BY MESNE ASSIGNMENTS, TO THE WELSBACH INCANDESCENT GAS LIGHT COMPANY, OF NEW JERSEY.

INCANDESCENT GAS-BURNER.

SPECIFICATION forming part of Letters Patent No. 409,520, dated August 20, 1889.

Application filed December 16, 1887. Serial No. 258,124. (No model.)

*To all whom it may concern:*

Be it known that I, JOHN L. STEWART, a citizen of the United States, residing at Philadelphia, in the county of Philadelphia and State of Pennsylvania, have invented certain new and useful Improvements in Incandescent Gas-Burners; and I do hereby declare the following to be a full, clear, and exact description of the invention, such as will enable others skilled in the art to which it appertains to make and use the same.

This invention relates to gas-burners and their immediate connections, whereby a brilliant illumination is produced by the combustion of a mixture of gas and air in contact with readily-incandescing bodies especially adapted for becoming incandescent in a flame.

The objects of this invention are to provide an improved incandescent gas-burner simpler in construction, more effective in operation, and less expensive to construct and to use than those heretofore proposed, and also to provide for securing the most advantageous effects resulting from arranging the incandescing bodies in the most favorable position for receiving the greatest amount of heat and giving the best light with a minimum combustion of gas, and for arranging them so as to be conveniently removable from the gas-burner, either in part or wholly, by the use of a supporting frame or cage; also, to provide generally, by the arrangement of the incandescing bodies and the number of the gas-jets, for securing as near a spossible the full calorific value of the gas consumed.

The construction and operation of the subject of my invention will now be described in detail with reference to the accompanying drawings, in which—

Figure 1 represents a side elevation of my improved burner with a row of perpendicularly-arranged incandescing-cylinders, such as rods, needles, or tubes. Fig. 2 represents a vertical cross-section of the same on the line $x\ x$ of Fig. 1. Fig. 3 represents a vertical longitudinal section thereof. Fig. 4 represents a plan of a burner saddle or top provided with a series of sockets to receive the lower ends of a number of incandescing rods or cylinders, said sockets being shown as alternating with a series of perforations for the exit of fine jet flames to heat said rods or cylinders. Fig. 5 represents a plan of burner saddle or top, in which the perforations or flame-passages are made concentric with the sockets to permit the passage of the flame-jets into the interior of incandescing-tubes to be placed in said sockets. Fig. 6 represents a side elevation of the burner with double rows of obliquely-arranged rods, needles, or tubes. Fig. 7 represents a plan view of the saddle for supporting the rods, needles, or tubes arranged as in Fig. 6. Fig. 8 represents a vertical section of the burner on the line $y\ y$ of Fig. 6. Fig. 9 represents a plan view of a three-part or triangular arrangement of saddle to be used with burner-heads of the same form. Fig. 10 represents, partly in section, a cluster-burner for use with incandescing rods, needles, or tubes, in which the burner-head and saddle each consists of a number of radial arms. Fig. 11 represents a plan view of the burner shown in Fig. 10 with parts broken away. Fig. 12 represents a plan view of an annular burner to be used with said rods, needles, or tubes, with part of the saddle broken away. Fig. 13 represents a plan view of said annular burner, in which the rod or tube sockets are peculiarly arranged with reference to the gas-jet openings in the saddle.

It will be readily seen that there might be many other shapes of my burner, and that it might be used in connection with many other incandescing bodies and forms than those above described, the above being enumerated only for the purpose of more clearly and distinctly showing the character and nature and application of my invention.

In carrying out my invention I make a burner composed essentially of a perforated burner-head and a cage or frame for holding the incandescing body, which may be made of any suitable refractory incandescing material and of such shape or form as may be required to suit the shape or form in which the particular burner is made. This cage or frame has a perforated saddle or base, which is provided with sockets for receiving or supporting the incandescing body used, and has stems or posts surmounted by a crown-piece rigidly connected with it, by which crown-piece or cross-head the upper end of the incandescing body is received and the same is suspended, supported, or held in position, as the case may be. In mounting the cage or frame upon the burner-head there is left an air-chamber between said saddle or base and the burner-head. The perforations of the saddle or base and of the burner-head are arranged so as to practically register with each other, and those in the saddle are made conical with the base of the cone on the under or lower side, and of larger size than those in the burner-head. Gas, under ordinary pressure, entering the burner-head will be forced through its perforations in fine jets. The jets of gas in crossing the air-space provided between the burner-head and the saddle or base and entering the conical openings in the saddle will draw in streams of air and result in numerous fine jets or flames at the base of the incandescing body, which latter will readily become incandescent in said flame and produce a brilliant light of high candle-power. When the gas is lighted, the saddle will soon become highly heated, so that the gas and the air mixture will be thoroughly heated in the passage between it and the burner-head.

The burner-head A is composed of a horizontal tube with a cylindrical socket $a$ on its under side, which is screw-threaded, as usual, for connection with the bracket or gas-supply pipe, and also has in its upper side, as above stated, a line of numerous small perforations $a'$, arranged, as above stated, for the escape of the gas in fine jets.

The frame or cage B is composed of the saddle or base $b$, the crown-piece or cross-head $c$, the stems or posts $d\ d$, and lugs or flanges $b'\ b'$, projecting down from the saddle and serving to support it on the burner-head A in such a manner as to form an air space or chamber C between said burner-head and saddle. The posts $d\ d$ are suitably secured to the ends of the crown-piece or cross-head $c$, and extend downward through the saddle or base $b$ into or through holes $a''$ in the burner-head, or they may be connected with the burner-head in any other convenient manner.

The saddle may be made of any suitable metal or of any refractory material—such as steatite, &c.—of any desired thickness. The posts are in no way secured in the burner-head, it being preferable that they should have loose bearings in the holes $a''$ thereof, so that the entire frame or cage may be readily removed and replaced for convenience of cleaning, repairing, &c.

The lower ends of the posts $d\ d$ may be flattened or made angular and the posts so constructed that they may be sprung, if desired, into suitable openings or sockets in the burner-heads.

Pins or lugs may project through or from the burner-head for passage through slots or holes in the saddle, thus holding it in place instead of in the manner above described. When this removable frame or cage is in place, the saddle or base $b$ rests upon the lugs $b'$. The saddle or base should be of the same general contour as the burner-head, so that if the latter is cylindrical in cross-section the former will be semi-cylindrical, in order that it may cover about half of it, and must also in its outline follow the outline of the burner-head, so that if the latter is circular the saddle will be circular.

The upper side of the saddle or base may have a line of small sockets $b''$ for receiving the lower end of the incandescing material. Where a number of separate sockets or depressions are used, there should be made between each one and at each end of the line the conical perforation $b'''$ for the passage of the mixed gas and air, resulting in a line of alternate perforations and sockets, as seen in Figs. 3 and 4.

The perforations $b'''$ in the saddle should register with the perforations $a'$ in the burner-head and are for the escape of mixed gas and air, and constitute gas-jet openings for producing the fine gas jets or flames. They differ from the perforations of the burner-head in that they are larger and conical, flaring outward on the lower side of the saddle, so as to allow the gas and air to shoot up without obstruction or leakage under the saddle-base. The crown-piece $c$ is made preferably of sheet metal or steatite, and has a row of perforations $c'$ to receive or support the incandescing bodies.

The incandescing body may be made of any suitable refractory material especially adapted for becoming incandescent in a gas flame, and can be removed or replaced at will. Where rods, needles, or tubes are used, or the incandescing body is composed of other like separate parts, these parts can be removed and replaced separately. The incandescing body, after being set in the frame, may be therein secured, if desired.

The crown-piece or cross-head $c$ may be provided with a groove $e$, either by cutting into the steatite or by turning up the edges of the metal, thereby forming a neat finish to the fixture, as well as providing a means for supporting or holding the incandescing bodies in place.

The crown-piece or cross-head may be made flat or ornamented in such way as desired. Where the incandescing body is not firmly fixed in the crown piece or cross-head, better opportunity is given for contraction and expansion.

The burner-head may be of any suitable shape, and several, together with their saddles, may be clustered together in the form of a triangle, (as in Fig. 9,) square, or any other polygonal form, or any curved form, or with arms radiating from a central socket used to connect the whole to the gas-supply pipe, in which event a central post $d'$ will connect with the inner ends of all the crown-pieces or cross-heads $c$ to sustain them, and the posts $d\ d$ may be dispensed with.

I have shown a variety of forms in the drawings, but the burner is capable of being made in almost any form which fancy may suggest.

Where rods, needles or tubes, are used, they can be arranged either in single or double or more rows, and placed in vertical or slanting lines crossing each other at any angle or any two angles to the axis of a vertical line, as may be desired. (See Figs. 6, 7 and 8.)

Where tubes are used instead of solid rods or needles, the perforations in the saddle may be made concentric with the socket or depression, and the flame thus caused to pass up through the tubes, whereby good results are produced. In such cases, however, openings should be made in the lower ends of the tubes to admit sufficient air to produce a perfect combustion of the gas. Where the burner-head and saddle are made annular, the jet or flame will incline or draw inward. To overcome this difficulty, I place the jet-openings, preferably, in a line at the middle of the top of the annular or polygonal burner-head and saddle, and I place the receptacle for the incandescing body from one thirty-second to one-sixteenth of an inch farther in, so that as the flame is drawn inward it impinges directly upon the incandescing body and heats it much more effectively than would otherwise be possible, although a good light is produced without any variation in the line of the perforations and of the receptacle.

In some instances the incandescing material may be suspended from the cross-head $c$, so as to hang over the flame produced by the burner-head and saddle.

In another application, Serial No. 259,026, filed December 27, 1887, I have described and claimed the combination of a burner-head having a number of fine perforations or gas-exits and provided with means (preferably a series of projecting points) for supporting a series of incandescent cylinders, a perforated crown-piece or cross-head supported above said burner-head, and a series of incandescing cylinders or tubes supported by said crown-piece and burner-head. My present invention differs from that above mentioned in providing the burner-head with a perforated and socketed saddle or top that forms a gas and air mixing chamber above the burner-head.

Having thus described my invention, what I claim, and desire to secure by Letters Patent, is—

1. In an incandescent gas-burner, the combination of a burner-head having a series of fine perforations or gas-exits, a saddle supported on the burner-head above said gas-exits and forming an intermediate gas and air mixing chamber, the saddle being provided with a series of perforations for the exit of the gas and air mixture and a series of sockets for the lower ends of a series of incandescing cylinders, a cage or frame supported above the saddle, and a series of incandescing cylinders supported by said cage and saddle, substantially as described.

2. In an incandescent gas-burner, the combination of a burner-head having a series of fine perforations or gas-exits, a saddle supported on the burner-head above said gas-exits and forming an intermediate gas and air mixing chamber, said saddle provided with a series of concentric sockets and perforations or flame-passages, a cage or frame supported above the saddle, and a series of incandescing tubes supported by said cage and saddle with their lower ends in the saddle-sockets, substantially as described.

In testimony whereof I affix my signature in presence of two witnesses.

JOHN L. STEWART.

Witnesses:
 CHAS. MATHEWS, Jr.,
 JAMES M. BEATTY.